US009835029B2

(12) United States Patent
Dumont et al.

(10) Patent No.: US 9,835,029 B2
(45) Date of Patent: Dec. 5, 2017

(54) DOWNHOLE FLUID ANALYSIS METHODS FOR DETERMINING VISCOSITY

(71) Applicant: Schlumberger Technology Corporation, Sugar Land, TX (US)

(72) Inventors: Hadrien Dumont, Houston, TX (US); Youxiang Zuo, Burnaby (CA); Beatriz E. Barbosa, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 330 days.

(21) Appl. No.: 14/560,880

(22) Filed: Dec. 4, 2014

(65) Prior Publication Data

US 2015/0159484 A1 Jun. 11, 2015

Related U.S. Application Data

(60) Provisional application No. 61/912,996, filed on Dec. 6, 2013.

(51) Int. Cl.
*E21B 49/08* (2006.01)

(52) U.S. Cl.
CPC ...... *E21B 49/088* (2013.01); *E21B 2049/085* (2013.01)

(58) Field of Classification Search
CPC ................ E21B 49/088; E21B 2049/085
USPC .............................. 166/250.02, 66
See application file for complete search history.

(56) References Cited

U.S. PATENT DOCUMENTS

| 7,036,362 B2 | 5/2006 | Haddad et al. |
| 2013/0019673 A1 | 1/2013 | Sroka et al. |
| 2013/0025359 A1 | 1/2013 | Cartellieri et al. |
| 2013/0151159 A1* | 6/2013 | Pomerantz ............ E21B 49/082 702/11 |

* cited by examiner

*Primary Examiner* — Taras P Bemko
(74) *Attorney, Agent, or Firm* — Michael Dae (57) ABSTRACT

The present disclosure relates to methods and apparatus for determining a viscosity-pressure profile of downhole fluid by measuring the viscosity at several different pressures during a sampling operation. According to certain embodiments, the viscosity may be measured at different times during a sampling operation and used to generate the viscosity-pressure profile. For example, the viscosity may be measured at the beginning of pumping, during filling of a sample chamber, during a pressure-build up period, and while retracting the probe. The measured viscosities may then be employed to determine a profile that represents the change in viscosity that occurs with pressure.

11 Claims, 5 Drawing Sheets

FIG. 6

DOWNHOLE FLUID ANALYSIS METHODS FOR DETERMINING VISCOSITY

CROSS-REFERENCE TO RELATED APPLICATIONS

This application claims benefit of U.S. Provisional Patent Application Ser. No. 61/912,996, filed Dec. 6, 2013, which is herein incorporated by reference.

BACKGROUND OF THE DISCLOSURE

Wellbores (also known as boreholes) are drilled to penetrate subterranean formations for hydrocarbon prospecting and production. During drilling operations, evaluations may be performed of the subterranean formation for various purposes, such as to locate hydrocarbon-producing formations and manage the production of hydrocarbons from these formations. To conduct formation evaluations, the drill string may include one or more drilling tools that test and/or sample the surrounding formation, or the drill string may be removed from the wellbore, and a wireline tool may be deployed into the wellbore to test and/or sample the formation. These drilling tools and wireline tools, as well as other wellbore tools conveyed on coiled tubing, drill pipe, casing or other conveyers, are also referred to herein as "downhole tools."

Formation evaluation may involve drawing fluid from the formation into a downhole tool for testing and/or sampling. Various devices, such as probes and/or packers, may be extended from the downhole tool to isolate a region of the wellbore wall, and thereby establish fluid communication with the subterranean formation surrounding the wellbore. Fluid may then be drawn into the downhole tool using the probe and/or packer. Within the downhole tool, the fluid may be directed to one or more fluid analyzers and sensors that may be employed to detect properties of the fluid.

SUMMARY

The present disclosure relates to a downhole fluid analysis method that includes initiating a sampling operation with a downhole tool disposed in a wellbore. The method also includes measuring a first viscosity and a first pressure during a first pressure phase of the sampling operation, and measuring a second viscosity and a second pressure during a second pressure phase of the sampling operation. The method further includes determining a viscosity-pressure profile based on the measured first and second viscosities and the measured first and second pressures.

The present disclosure also relates to a downhole fluid analysis method that includes initiating a sampling operation with a downhole tool disposed in a wellbore. The method also includes measuring a first viscosity and a first pressure in a flowline during a pumping phase of a sampling operation, measuring a second viscosity and a second pressure in the flowline during a sample chamber filling phase of the sampling operation, measuring a third viscosity and a third pressure in the flowline during a pressure build-up phase of the sampling operation, and measuring a fourth viscosity and a fourth pressure in the flowline during a probe retraction phase of the sampling operation. The method further includes determining a viscosity-pressure profile based on the measured first, second, third, and fourth viscosities and pressures.

The present disclosure further relates to a downhole tool that includes a pressure sensor to measure pressures of formation fluid within a flowline during a pumping phase, a sample chamber filling phase, a pressure build-up phase, and a probe retraction phase of a sampling operation. The downhole tool also includes a viscosity sensor to measure viscosities of the formation fluid within the flowline during the pumping phase, the sample chamber filling phase, the pressure build-up phase, and the probe retraction phase. The downhole tool further includes a controller designed to execute instructions stored within the downhole tool to determine a pressure-viscosity profile based on the measured pressures and viscosities.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the present disclosure provides many different embodiments, or examples, for implementing different features of various embodiments. Specific examples of components and arrangements are described below to simplify the present disclosure. These are, of course, merely examples and are not intended to be limiting.

The present disclosure relates to methods for determining a viscosity-pressure profile of downhole fluid by measuring the viscosity at several different pressures during a sampling operation. According to certain embodiments, the viscosity-pressure profile may be determined in substantially real-time during a sampling operation. In certain embodiments, the viscosity may be measured at different times during a sampling operation, where different pressures occur, and used to generate the viscosity-pressure profile. For example, the viscosity may be measured at while pumping fluid through the tool, during filling of a sample chamber, during a pressure-build up period, and while retracting the probe. The measured viscosities may then be employed to determine a profile that represents the change in viscosity that occurs with pressure. In certain embodiments, an equation representing the profile may be generated and employed to adjust pressure within the wellbore to maximize production.

Figure 1:
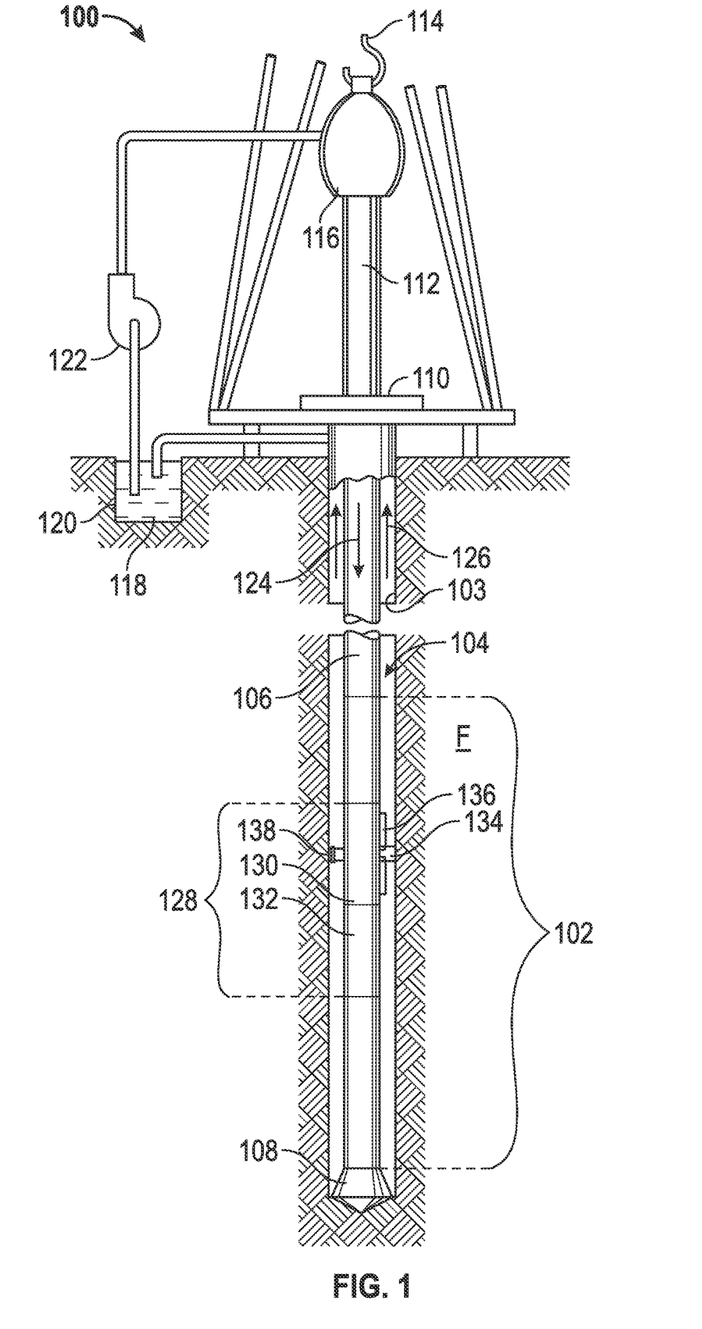
FIG. 1 is a schematic view of an embodiment of a wellsite system that may employ downhole fluid analysis methods for determining viscosity, according to aspects of the present disclosure.
Figure 2:
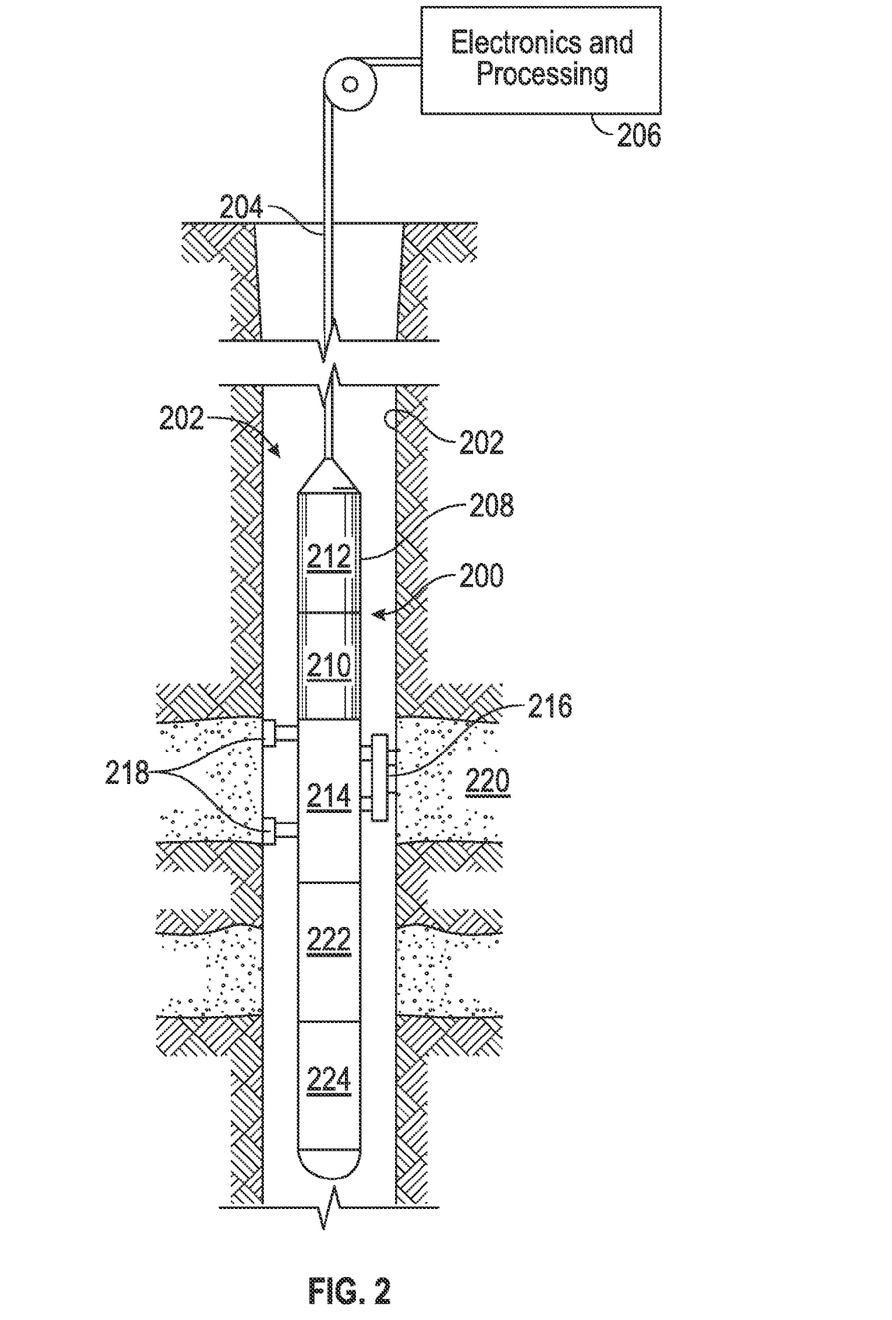
FIG. 2 is a schematic view of another embodiment of a wellsite system that may employ downhole fluid analysis methods for determining viscosity, according to aspects of the present disclosure.

FIGS. 1 and 2 depict examples of wellsite systems that may employ the fluid analysis systems and techniques described herein. FIG. 1 depicts a rig 100 with a downhole tool 102 suspended therefrom and into a wellbore 104 via a drill string 106. The downhole tool 100 has a drill bit 108 at its lower end thereof that is used to advance the downhole tool into the formation and form the wellbore. The drillstring 106 is rotated by a rotary table 110, energized by means not shown, which engages a kelly 112 at the upper end of the drillstring 106. The drillstring 106 is suspended from a hook 114, attached to a traveling block (also not shown), through the kelly 112 and a rotary swivel 116 that permits rotation of the drillstring 106 relative to the hook 114. The rig 100 is depicted as a land-based platform and derrick assembly used to form the wellbore 104 by rotary drilling. However, in other embodiments, the rig 100 may be an offshore platform.

Drilling fluid or mud 118 is stored in a pit 120 formed at the well site. A pump 122 delivers the drilling fluid 118 to the interior of the drillstring 106 via a port in the swivel 116, inducing the drilling fluid to flow downwardly through the drillstring 106 as indicated by a directional arrow 124. The drilling fluid exits the drillstring 106 via ports in the drill bit 108, and then circulates upwardly through the region between the outside of the drillstring and the wall of the wellbore, called the annulus, as indicated by directional arrows 126. The drilling fluid lubricates the drill bit 108 and carries formation cuttings up to the surface as it is returned to the pit 120 for recirculation.

The downhole tool 102, sometimes referred to as a bottom hole assembly ("BHA"), may be positioned near the drill bit 108 and includes various components with capabilities, such as measuring, processing, and storing information, as well as communicating with the surface. A telemetry device (not shown) also may be provided for communicating with a surface unit (not shown).

The downhole tool 102 further includes a sampling system 128 including a fluid communication module 130 and a sampling module 132. The modules may be housed in a drill collar for performing various formation evaluation functions, such as pressure testing and sampling, among others. As shown in FIG. 1, the fluid communication module 130 is positioned adjacent the sampling module 132; however the position of the fluid communication module 130, as well as other modules, may vary in other embodiments. Additional devices, such as pumps, gauges, sensor, monitors or other devices usable in downhole sampling and/or testing also may be provided. The additional devices may be incorporated into modules 130 and 132 or disposed within separate modules included within the sampling system 128.

The fluid communication module 130 includes a probe 134, which may be positioned in a stabilizer blade or rib 136. The probe 134 includes one or more inlets for receiving formation fluid and one or more flowlines (not shown) extending into the downhole tool for passing fluids through the tool. In certain embodiments, the probe 134 may include a single inlet designed to direct formation fluid into a flowline within the downhole tool. Further, in other embodiments, the probe may include multiple inlets that may, for example, be used for focused sampling. In these embodiments, the probe may be connected to a sampling flow line, as well as to guard flow lines. The probe 134 may be movable between extended and retracted positions for selectively engaging a wall 103 of the wellbore 104 and acquiring fluid samples from the formation F. One or more setting pistons 138 may be provided to assist in positioning the fluid communication device against the wellbore wall.

FIG. 2 depicts an example of a wireline downhole tool 200 that may employ the systems and techniques described herein. The downhole tool 200 is suspended in a wellbore 202 from the lower end of a multi-conductor cable 204 that is spooled on a winch at the surface. The cable 204 is communicatively coupled to an electronics and processing system 206. The downhole tool 200 includes an elongated body 208 that houses modules 210, 212, 214, 222, and 224, that provide various functionalities including fluid sampling, fluid testing, operational control, and communication, among others. For example, the modules 210 and 212 may provide additional functionality such as fluid analysis, resistivity measurements, operational control, communications, coring, and/or imaging, among others.

As shown in FIG. 2, the module 214 is a fluid communication module 214 that has a selectively extendable probe 216 and backup pistons 218 that are arranged on opposite sides of the elongated body 208. The extendable probe 216 is configured to selectively seal off or isolate selected portions of the wall 203 of the wellbore 202 to fluidly couple to the adjacent formation 220 and/or to draw fluid samples from the formation 220. The probe 216 may include a single inlet or multiple inlets designed for guarded or focused sampling. The formation fluid may be expelled to the wellbore through a port in the body 208 or the formation fluid may be sent to one or more fluid sampling modules 222 and 224. The fluid sampling modules 222 and 224 may include sample chambers that store the formation fluid. In the illustrated example, the electronics and processing system 206 and/or a downhole control system are configured to control the extendable probe assembly 216 and/or the drawing of a fluid sample from the formation 220.

Figure 3:
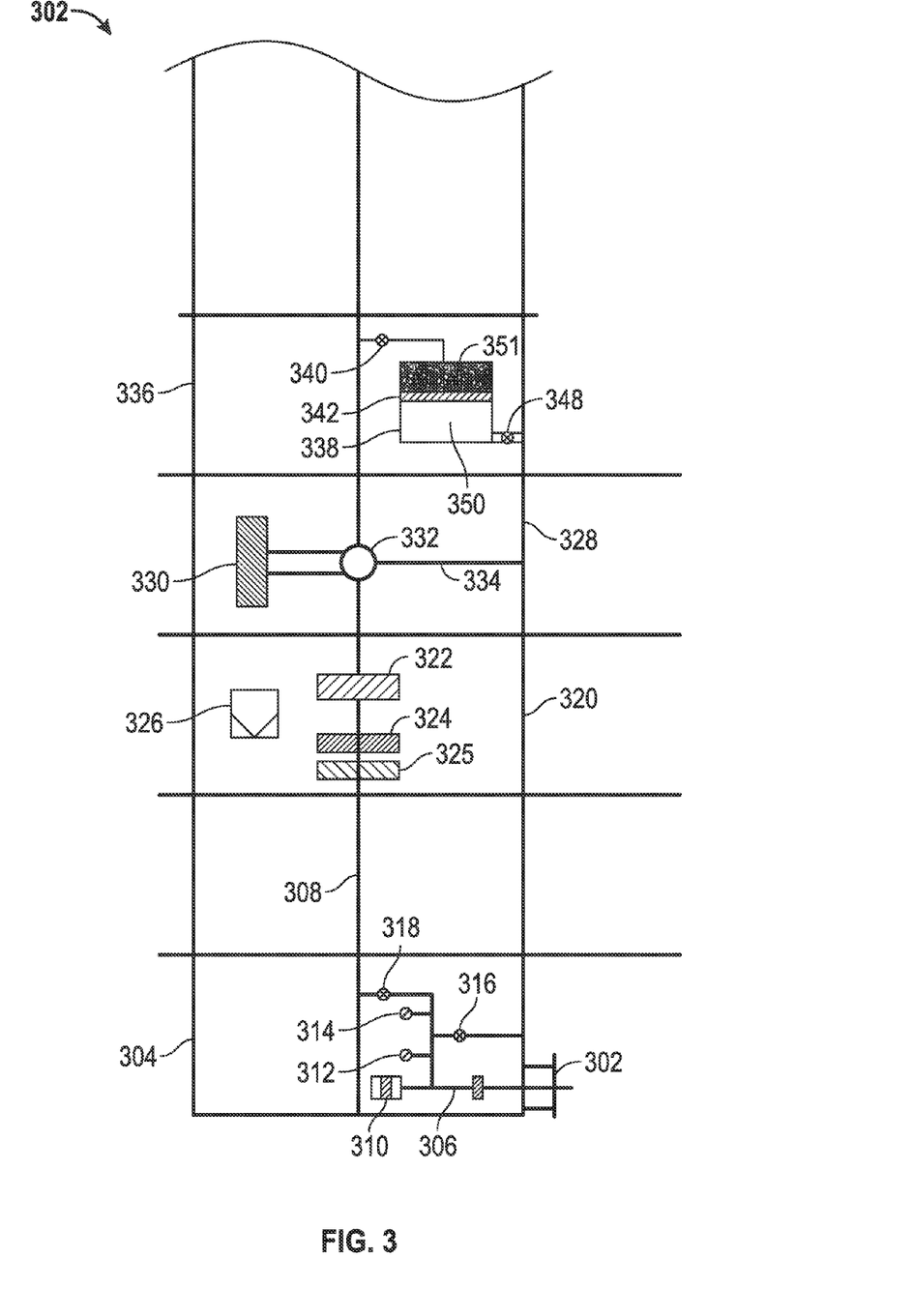
FIG. 3 is a schematic representation of an embodiment of a downhole tool that may employ downhole fluid analysis methods for determining viscosity, according to aspects of the present disclosure.

FIG. 3 is a schematic diagram of a portion of a downhole tool 300 that may employ the fluid analysis methods described herein. For example, the downhole tool 300 may be a drilling tool, such as the downhole tool 102 described above with respect to FIG. 1. Further, the downhole tool 300 may be a wireline tool, such as the downhole tool 200 described above with respect to FIG. 2. Further, in other embodiments, the downhole tool may be conveyed on wired drill pipe, a combination of wired drill pipe and wireline, or other suitable types of conveyance.

As shown in FIG. 3, the downhole tool 300 includes a fluid communication module 304 that has a probe 302 for directing formation fluid into the downhole tool 300. According, to certain embodiments, the fluid communication module 304 may be similar to the fluid communication modules 130 and 214, described above with respect to FIGS. 1 and 2, respectively. The fluid communication module 304 includes a probe flowline 306 that directs the fluid to a primary flowline 308 that extends through the downhole tool 300. The fluid communication module 304 also includes a pump 310 and pressure gauges 312 and 314 that may be employed to conduct formation pressure tests. An equalization valve 316 may be opened to expose the flowline 306 to the pressure in the wellbore, which in turn may equalize the pressure within the downhole tool 300. Further, an isolation valve 318 may be closed to isolate the formation fluid within the flowline 306, and may be opened to direct the formation fluid from the probe flowline 306 to the primary flowline 308.

The primary flowline 308 directs the formation fluid through the downhole tool to a fluid analysis module 320 that includes a fluid analyzer 322 that can be employed to provide downhole fluid measurements. For example, the fluid analyzer 322 may include an optical spectrometer and/or a gas analyzer designed to measure properties such as, optical density, fluid fluorescence, fluid composition, and the fluid gas oil ratio (GOR), among others. One or more additional measurement devices, such as temperature sensors, resistivity sensors, chemical sensors (e.g., for measuring pH or $H_2S$ levels), and gas chromatographs, also may be included within the fluid analyzer 322. The fluid analysis module also includes a pressure sensor 324 and a viscosity sensor 325. According to certain embodiments, the viscosity sensor 325 may include a density sensor that may be combined into a single sensor, such as a microelectromechanical (MEMS) density and viscosity sensor, density-viscosity rod, or an ultrasonic transducer that measures viscosity and density. In certain embodiments, the fluid analysis module 320 may include a controller 326, such as a microprocessor or control circuitry, designed to calculate certain fluid properties based on the sensor measurements. For example, the controller 326 may calculate the viscosity-pressure profile, as described further below with respect to FIG. 4. Further, in certain embodiments, the controller 326 may govern sampling operations based on the fluid measurements or properties. Moreover, in other embodiments, the controller 326 may be disposed within another module of the downhole tool 300.

The downhole tool 300 also includes a pump out module 328 that has a pump 330 designed to provide motive force to direct the fluid through the downhole tool 300. According to certain embodiments, the pump 330 may be a hydraulic displacement unit that receives fluid into alternating pump chambers. A valve block 332 may direct the fluid into and out of the alternating pump chambers. The valve block 332 also may direct the fluid exiting the pump 330 through the remainder of the primary flowline 308 (e.g., towards the sample module 336) or may divert the fluid to the wellbore through an exit flowline 334.

The downhole tool 300 also includes one or more sample modules 336 designed to store samples of the formation fluid within a sample chamber 338. As shown in FIG. 3, a single sample chamber 338 is included within the sample module 336. However, in other embodiments, multiple sample chambers may be included within the sample module 336 to provide for storage of multiple formation fluid samples. Further, in other embodiments, multiple sample modules 336 may be included within the downhole tool. Moreover, other types of sample chambers, such as single phase sample bottles, among others, may be employed in the sample module 336.

The sample module 336 includes a valve 342 that may be actuated to divert the formation fluid into the sample chamber 338. The sample chamber 338 includes a floating piston 342 that divides the sample chamber into two volumes 350 and 351. As the formation fluid flows through the primary flowline 308, the valve 340 may be actuated to divert the formation fluid into the volume 350. In certain embodiments, the pump 330 may provide the motive force to direct the fluid through the primary flowline 308 and into the sample chamber 338. The formation fluid may be stored within the volume 351 and, in certain embodiments, may be brought to the surface for further analysis. The sample module 336 also may include a valve 348 that can be opened to expose the volume 350 of the sample chamber 338 to the annular pressure. In certain embodiments, the valve 348 may be opened to allow buffer fluid to exit the volume 350 to the wellbore, which may provide backpressure during filling of the volume 351 that receives formation fluid. In other embodiments, the volume 350 may be filled with a low pressure gas that provides backpressure during filling of the volume 351.

Figure 4:
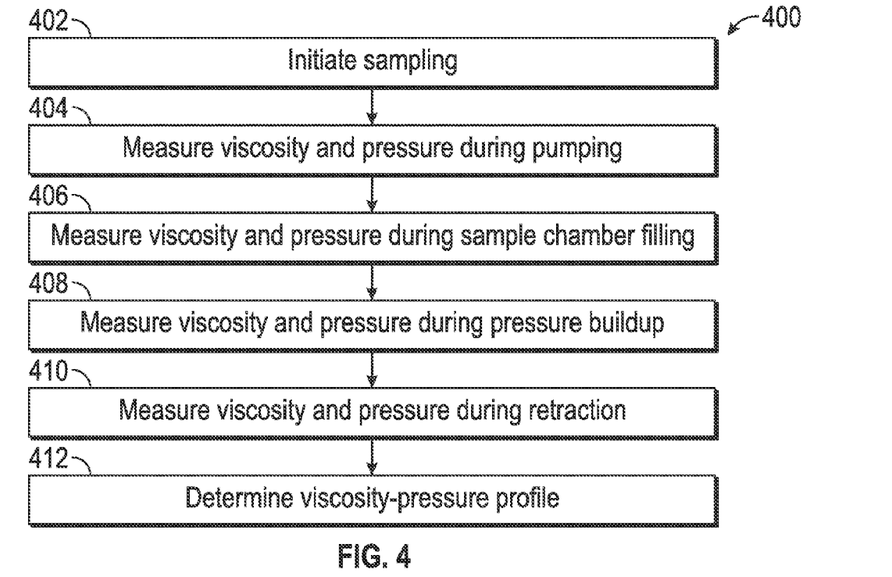
FIG. 4 is a flowchart depicting a fluid analysis method for determining viscosity, according to aspects of the present disclosure.

FIG. 4 is a flowchart depicting an embodiment of a method 400 that may be employed to determine viscosity of formation fluid. According to certain embodiments, the method 400 may be executed, in whole or in part, by the controller 326 (FIG. 3). For example, the controller 326 may execute code stored within circuitry of the controller 326, or within a separate memory or other tangible readable medium, to perform the method 400. In certain embodiments, the method 400 may be wholly executed while the tool 300 is disposed within a wellbore, allowing a substantially real-time determination of the viscosity-pressure profile of the formation fluid. Further, in certain embodiments, the controller 326 may operate in conjunction with a surface controller, such as the electronics and processing system 206 (FIG. 2), which may perform one or more operations of the method 400.

The method 400 may begin by initiating (block 402) a sampling operation. For example, as shown in FIG. 3, the downhole tool 300 may be conveyed to a desired location within a wellbore, and the probe 302 may be extended to engage a wall of the wellbore. The pump 330 may be operated to draw formation fluid into the downhole tool 300 through the probe. The formation fluid may then be routed through the downhole tool and expelled to the wellbore. For example, the formation fluid may be pumped through the primary flowline 308 and expelled to the wellbore through the exit flowline 334. During pumping of formation fluid through the downhole tool, the viscosity and pressure of the formation fluid may be measured (block 404). For example, the formation fluid may be pumped through the primary flowline 308 to the fluid analysis module 320 where the pressure sensor 324 and the viscosity sensor 325 may measure the pressure and viscosity, respectively. The fluid analyzer 322 also may be employed to determine properties of the formation fluid, such as the contamination level. The formation fluid may then flow through the pump 300 and may be expelled to the wellbore, for example, through the exit flowline 334.

When the formation fluid exhibits desired properties, such as a low contamination level, the formation fluid may be directed to the sample chamber 338 for storage. For example, the controller 326 may open the valve 340 and set the valve block 332 to direct the formation fluid through the primary flowline 308 to the sample chamber 338. While the sample chamber 338 is being filled, the viscosity and pressure of the formation fluid may be measured (block 406) using the viscosity sensor 325 and the pressure sensor 324, respectively. In certain embodiments, multiple sample chambers may be filled and the viscosity and pressure may be measured (block 406) during the filling of each sample chamber. Further, the viscosity and pressure also may be measured (block 404) during pumping that occurs between sample chamber filling.

Figure 5:
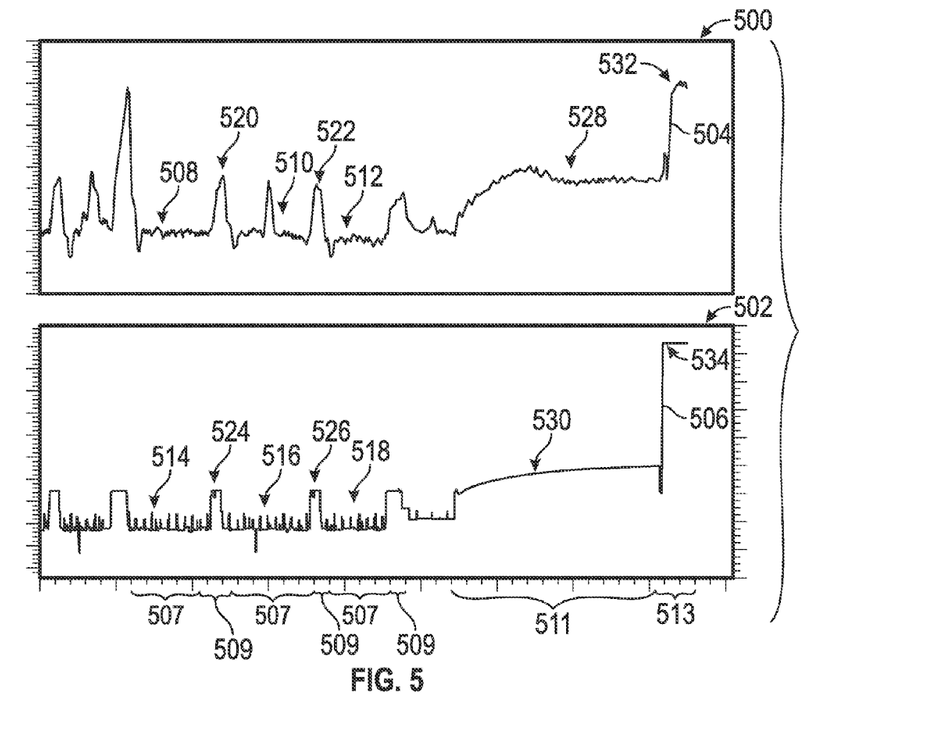
FIG. 5 is an illustration of charts depicting viscosity and pressure measurements obtained during sampling, according to aspects of the present disclosure.

FIG. 5 depicts examples of measurements that may be obtained during pumping of formation fluid through the downhole tool and during filling of sample chambers within the downhole tool. The top chart 500 depicts the viscosity 504 measured by the viscosity sensor 325 and the bottom chart 502 depicts the pressure 506 measured by the pressure sensor 324. The x-axis of each chart 500 and 502 represents elapsed time and the y-axis of each chart 500 and 502 represents the viscosity 504 and the pressure 506, respectively.

As shown in FIG. 5, valleys 508, 510, 512, 514, 516, and 518 occur during pumping that occurs between sample chamber fillings. In particular, valleys 508, 510, and 512 represent the relatively low viscosity measurements that occur during pumping of fluid through the tool, and the valleys 514, 516, and 518 represent the relatively low pressure measurements that occur during pumping of fluid through the tool. The pressures and viscosities are measured (block 404) during the pumping phases 507 where fluid is directed through the downhole and expelled to the wellbore. As shown in FIG. 5, the pumping phases occur prior to and between the sample chamber filling phases 509 where fluid is directed into sample chambers. As may be appreciated, the pressure may be relatively low while pumping prior to, between, and/or after sample chamber filling because the formation fluid may be directed through the downhole tool 300 and expelled to the wellbore, for example, through the exit flowline 334 (FIG. 3).

As shown in FIG. 5, the viscosity and pressure is measured (block 404) at three separate times while pumping formation fluid through the tool. In certain embodiments, the average or median of these measurements may be employed to develop the viscosity-pressure profile; while in other embodiments, each of the measurements may be used to develop the viscosity-pressure profile. Further, in other embodiments, the viscosity and pressure may be measured a single time while pumping (e.g., during one of the pumping phases 507), or one of the sets of viscosity and pressure measurements may be selected for use in developing the viscosity-pressure profile.

The spikes 520, 522, 524, and 526 represent measurements taken during filling of sample chambers. In particular, the spikes 520 and 524 represent the viscosity and pressure, respectively, measured during the filling of a first sample chamber, and the spikes 522 and 526 represent the viscosity and pressure, respectively, measured during the filling of a second sample chamber. The pressures and viscosities are measured (block 406) during sample chamber filling phases 509 where fluid is directed into a sample chamber 338. As may be appreciated, the pressure may increase during filling of a sample chamber due to the backpressure provided in the sample chamber during filling, for example, by the piston 342 and the fluid in the volume 350.

As shown in FIG. 5, the viscosity and pressure is measured (block 406) at two separate times while directing formation fluid into a sample chamber. In certain embodiments, the average or median of these measurements may be employed to develop the viscosity-pressure profile, while in other embodiments, each of the measurements may be used to develop the viscosity-pressure profile. Further, in other embodiments, the viscosity and pressure may be measured a single time while filling a sample chamber (e.g., during a single sample chamber filling phase 509), or one of the sets of viscosity and pressure measurements may be selected for use in developing the viscosity-pressure profile.

Returning to FIG. 4, the method may continue by measuring (block 408) the viscosity and pressure during a pressure build-up. For example, after the sample chambers have been filled, the pump 330 may be stopped while the probe 302 remains engaged with the wellbore wall, allowing pressure within the primary flowline 308 to increase (e.g., to build). The valve 318 may remain open, and the pressure and viscosity may be measured (block 408) using the pressure sensor 324 and the viscosity sensor 325, respectively. The pressure at the probe 302 may then be equalized, for example, by opening the equalization valve 316, and the probe 302 may be retracted from the formation. During retraction of the probe 302, the valve 318 may remain open and the pressure and viscosity in the primary flowline 308 may be measured (block 410) using the pressure sensor 324 and the viscosity sensor 325, respectively.

FIG. 5 depicts examples of viscosities and pressures that may be measured during a pressure build-up phase 511 and during a probe retraction phase 513. Points 528 and 530 represent viscosity and pressure measurements, respectively, that may be measured (block 408) during a pressure build-up phase 511. As may be appreciated, during the pressure build-up phase, the pressure may increase towards the formation pressure because pumping within the tool has ceased. Spikes 532 and 534 represent viscosity and pressure measurements, respectively, that may be measured (block 410) during the probe retraction phase 513. As may be appreciated, during the probe retraction phase, the pressure may spike as the probe is retracted from the wellbore wall and the pressure is equalized to the wellbore pressure, which is generally higher than the formation pressure.

The viscosities and pressures measured during pumping (block 404), during sample chamber filling (block 406), during pressure build-up (block 408), and during retraction of the probe (block 410) may be provided to the controller 326, for example, in the form of control signals from the pressure sensor 324 and the viscosity sensor 325. The controller 326 may then determine (block 412) the viscosity-pressure profile based on the measurements. According to certain embodiments, the viscosity and pressure measurements from each of the pumping phases 507, the sample chamber filling phases 509, the pressure build-up phase 511, and the probe retraction phase 513 may be employed to determine the pressure-viscosity profile. However, in other embodiments, any combination of measurements from two or more of the foregoing phases 507, 509, 511, and 513 may be employed to determine the viscosity-pressure profile.

According to certain embodiments, the controller 326 may employ a curve fitting algorithm, or other suitable method, to develop a function that represents the variation in viscosity with respect to pressure. Further, in certain embodiments, the controller 326 may generate a graphical representation of the viscosity-pressure profile that can be displayed at the surface, for example, using the electronics and processing system 206. Moreover, in other embodiments, the controller 326 may provide the pressure and viscosity measurements to a surface controller, for example, the electronics and processing system 206, that develops the viscosity-pressure profile.

Figure 6:
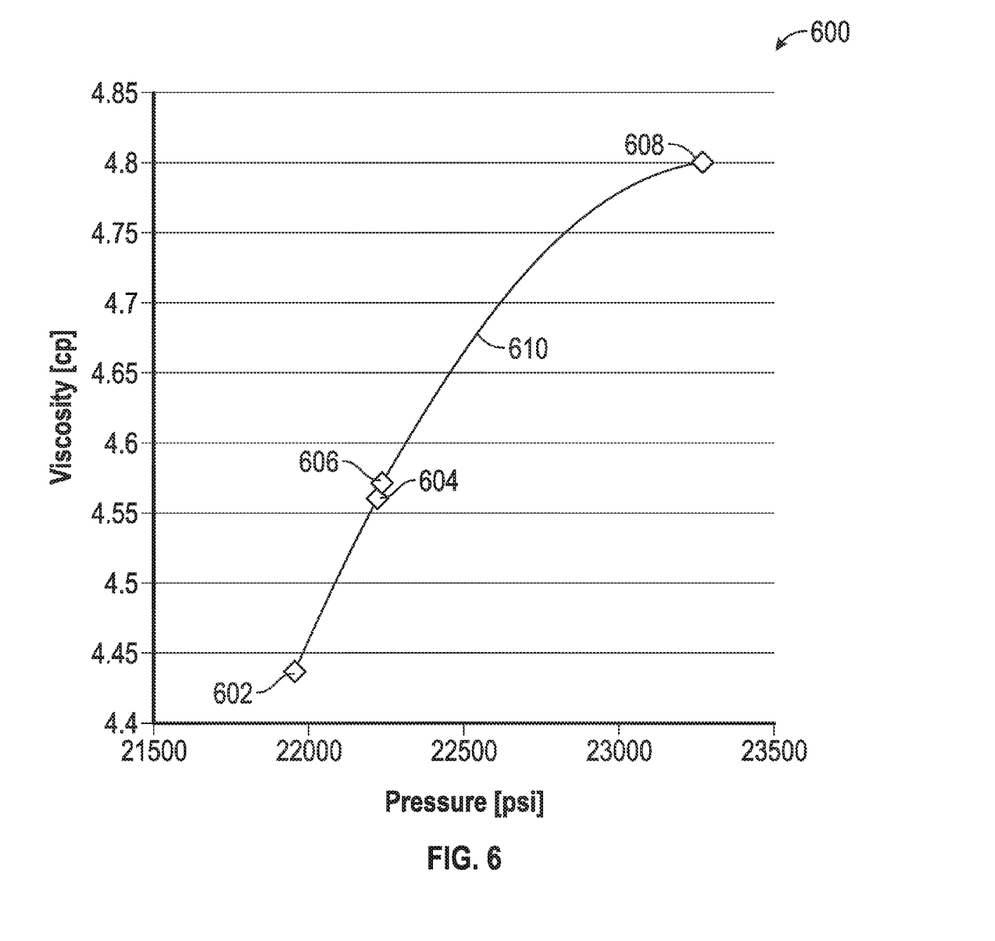
FIG. 6 is a chart depicting an embodiment of a pressure-viscosity profile, according to aspects of the present disclosure.

FIG. 6 is chart 600 depicting an embodiment of a viscosity-pressure profile 610. The x-axis represents pressure and the y-axis represents viscosity. The viscosity-pressure profile 610 may be generated from the data points 602, 604, 606, and 608. In particular, data point 602 may represent measurements taken during pumping (block 404); data point 604 may represent measurements taken during sample chamber filling (block 406); data point 606 may represent measurements taken during pressure build-up (block 408); and data point 608 may represent measurements taken during probe retraction (block 410). The viscosity-pressure profile 610 represents the function that fits, or most closely fits, each of the data points 602, 604, 606, and 608. In certain embodiments, the viscosity-pressure profile 610 may be represented by an equation. For example, in the embodiment shown in FIG. 6, the viscosity-pressure profile 610 may be represented by an equation of the logarithmic form:

$$\ln \frac{\eta}{\eta_{ref}} = c(P - P_{ref}) \qquad (1)$$

where η represents viscosity; P represents pressure; $\eta_{ref}$ represents the reference viscosity; $P_{ref}$ represents a reference pressure; and c is an adjustable parameter determined through the curve-fitting process. In determining c, the data points 602, 604, 606, and 608 may each be employed as the reference viscosity and pressure, so that the equation holds true across the pressure and viscosity spectrum. The equation may be employed to determine the viscosity of the formation fluid at any desired pressure or subsequently measured formation pressure. Further, the equation may be employed to determine a pressure that should be achieved in the wellbore to obtain a desired viscosity. According to certain embodiments, the equation, or the viscosity-pressure profile that the equation represents, may be employed to determine a pressure at which the wellbore should be set to achieve a desired viscosity for maximizing production.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A downhole fluid analysis method comprising:
   initiating a sampling operation with a downhole tool disposed in a wellbore;
   measuring a first viscosity and a first pressure during a first pressure phase of the sampling operation;
   measuring a second viscosity and a second pressure during a second pressure phase of the sampling operation; and
   determining a viscosity-pressure profile based on the measured first and second viscosities and the measured first and second pressures, wherein
   (1) the first pressure phase comprises pumping formation fluid through the downhole tool and expelling the formation fluid into the wellbore, and wherein the second pressure phase comprises directing the formation fluid into a sample chamber of the downhole tool; or
   (2) the first pressure phase comprises directing the formation fluid into a sample chamber of the downhole tool, and wherein the second pressure phase comprises retracting a probe from the formation; or
   (3) the first pressure phase comprises directing the formation fluid into a sample chamber of the downhole tool, and wherein the second pressure phase comprises retracting a probe from the formation.

2. The downhole fluid analysis method of claim 1, comprising:
   measuring a third viscosity and a third pressure during a third pressure phase of the sampling operation; and
   measuring a fourth viscosity and a fourth pressure during a fourth pressure phase of the sampling operation;
   wherein determining the viscosity-pressure profile comprises fitting a curve to the first, second, third, and fourth viscosities and pressures.

3. The downhole fluid analysis method of claim 2, wherein each of the first, second, third, and fourth pressure phases produce a different pressure within a flowline of the downhole tool.

4. A downhole fluid analysis method comprising:
   initiating a sampling operation with a downhole tool disposed in a wellbore;
   measuring a first viscosity and a first pressure in a flowline during a pumping phase of the sampling operation;
   measuring a second viscosity and a second pressure in the flowline during a sample chamber filling phase of the sampling operation;
   measuring a third viscosity and a third pressure in the flowline during a pressure build-up phase of the sampling operation;
   measuring a fourth viscosity and a fourth pressure in the flowline during a probe retraction phase of the sampling operation; and
   determining a viscosity-pressure profile based on the measured first, second, third, and fourth viscosities and pressures.

5. The downhole fluid analysis method of claim 4, wherein the pumping phase comprises directing formation fluid into the downhole tool through a probe and expelling the formation fluid from the downhole tool into the wellbore.

6. The downhole fluid analysis method of claim 5, wherein the sample chamber filling phase comprises directing the formation fluid into a sample chamber of the downhole tool.

7. The downhole fluid analysis method of claim 6, wherein directing the formation fluid into the sample chamber comprises displacing a buffer fluid from the sample chamber.

8. The downhole fluid analysis method of claim 4, wherein the pressure build-up phase comprises stopping operation of a pump while a probe is engaged with a wall of the wellbore.

9. The downhole fluid analysis method of claim 8, wherein the probe retraction phase comprises retracting the probe from the wall of the wellbore.

10. The downhole fluid analysis method of claim 4, wherein determining the viscosity-pressure profile comprises determining a logarithmic function representing a change in the measured first, second, third, and fourth viscosities with respect to the first, second, third, and fourth pressures.

11. The downhole fluid analysis method of claim 4, comprising displaying a graphical representation of the viscosity-pressure profile.

* * * * *